March 8, 1955 W. E. SHORE 2,703,716
SAW BLADE PLUNGER AND CHUCK ASSEMBLY
Filed Sept. 26, 1952
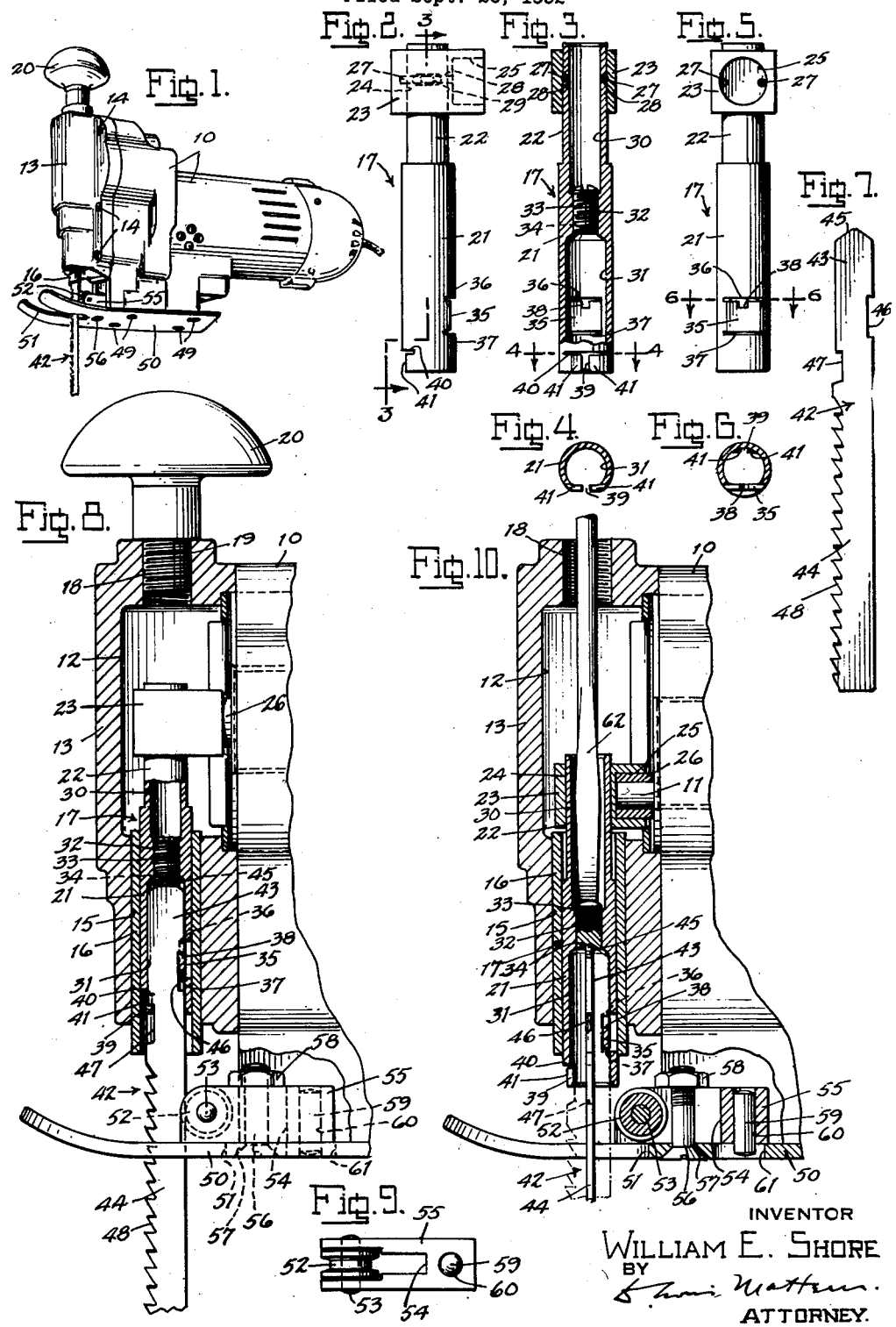
INVENTOR
WILLIAM E. SHORE
BY
ATTORNEY.

United States Patent Office 2,703,716
Patented Mar. 8, 1955

2,703,716

SAW BLADE PLUNGER AND CHUCK ASSEMBLY

William E. Shore, West New Brighton, N. Y., assignor to Harold S. Forsberg, Shelton, Conn.

Application September 26, 1952, Serial No. 311,725

4 Claims. (Cl. 279—93)

The present invention relates to an improved saw blade plunger and chuck assembly particularly for use in motor driven tools, such as electric hand saws in which the saw blade is of the saber type and has a rapid reciprocating motion imparted thereto, and in which the tool is generally moved over the material to be sawed as the operator guides the saw blade along the line of the cut which is being made.

Because of the very rapid reciprocating motion imparted to the blade, approximately 3,000 blade strokes per minute, and the varying strains placed upon the blades during the cutting operation, it is extremely important that the blade be not only firmly held by the chuck, but that it also be maintained against twisting or displacement from a parallel relation with the plunger. It is also desirable that the chuck be such as to permit of the quick removal and insertion of the blades.

It is an object of the invention to provide a saw blade plunger and chuck assembly in which these advantages are realized.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modification as fall within the spirit of the invention and the scope of the appended claims.

In the drawing:

Fig. 1 is a perspective view of an electric hand saw embodying the saw blade plunger and chuck assembly of the invention;

Fig. 2 is a side elevation of the plunger;

Fig. 3 is a view partially in front elevation and partially in vertical section, taken along the line 3—3 of Fig. 2;

Fig. 4 is a horizontal sectional view taken along the line 4—4 of Fig. 3;

Fig. 5 is a rear elevation of the plunger;

Fig. 6 is a horizontal sectional view taken along the line 6—6 of Fig. 5;

Fig. 7 is a side elevation of the saw blade;

Fig. 8 is a vertical sectional view of the plunger housing of the tool as shown in Fig. 1, the adjacent portion of the gear box housing being shown in side elevation, this view showing the saw blade in its secured relation in the chuck part of the plunger, and the latter being shown in its mid-stroke position;

Fig. 9 is a detail top plan view of the guide roller and bracket employed; and

Fig. 10 is a vertical sectional view substantially similar to Fig. 8, showing the saw blade inserted in the plunger preparatory to being fastened therein, and further showing in dot-and-dash lines the position to which the blade is turned to align it with the locking means of the chuck part of the plunger.

Referring to the drawings, the electric hand saw, in which the saw blade plunger and chuck assembly of the invention is incorporated, consists of a main housing 10 carrying an electric motor in its rearwardly extending portion and a motion converting mechanism in its forward portion, this motion converting mechanism being of any suitable type to convert the rotary movement of the motor shaft to a vertical reciprocating motion of a drive part for the saw blade carrying plunger. The motion converting mechanism may, for instance, be of the hypocycloid type as shown in my co-pending patent application for Motor Driven Saw, Ser. No. 183,988 filed September 9, 1950. The drive part is illustrated in Figs. 8 and 10 as a vertically reciprocating driving stud or pin 11 which projects into a pocket 12 of the forward plunger housing 13, which is secured upon the housing 10 by screws 14.

In the lower portion of the housing 13 there is provided a vertical cylindrical bore 15 in which there is secured, as by a force fit, a vertical cylindrical sleeve bearing guide 16 for the plunger 17. In the upper end of the housing 13, in axial line with the plunger, there is provided a threaded hole 18 in which the threaded stud 19 of a knob-like handle 20 is engaged. Upon removal of this handle, access may be had with a screw driver to the plunger, for the purpose of releasing or securing the saw blade, as will hereinafter more clearly appear.

The plunger 17 is of generally tubular form and includes a lower cylindrical portion 21 having a sliding fit in the bearing sleeve 16, and an upper cylindrical portion 22 of smaller diameter than the portion 21 upon which is secured a coupling member 23. The coupling member may be conveniently made from a piece of square steel stock having a vertical bore 24 to receive the upper end 22 of the plunger, and a second horizontal bore 25 in its rearward side, in which is engaged a cylindrical tubular journal bearing 26 for the stud or pin 11. The coupling member is rigidly connected to the plunger by a pair of locking pins 27—27 inserted in holes 28—28 in the coupling member and engaging transverse grooves 29—29 in the wall of the portion 22 of the plunger.

The bore through the tubular plunger includes an upper cylindrical portion 30, open at its upper end for receiving a screw driver inserted through the opening 18 of the housing 13, as shown in Fig. 10, a lower cylindrical chuck portion 31 for receiving the upper end portion of a saw blade, and an intermediate portion 32 screw threaded to receive a headless set screw 33 having its slotted upper end disposed in the lower end of the portion 30 for engagement by a screw driver, and having in its lower end a circular conically shaped pocket 34 for engaging the upper end of the saw blade, as will presently more fully appear.

At a point intermediate the upper and lower ends of the chuck portion 31 of the plunger, there is provided at the rearward side a depressed locking lug 35, which extends as a bridge across the circumference of the cylindrical inner wall of the chuck portion with its outer surface substantially tangential to said inner wall. The depressed lug is conveniently formed by providing vertically spaced parallel saw cuts 36 and 37 in the wall of the plunger, which define the upper and lower edges of the lug, the metal between the saw cuts being thereupon depressed by suitable forming dies into flat relation, as shown in Fig. 6. It will be understood that the plunger is preferably formed of steel, and that the forming operation for the depressed lug may be carried out by annealing and subsequent hardening.

At the upper edge of the depressed lug 35 there is provided a square cut recess 38 having its center disposed in the vertical diametric plane of the plunger parallel to the plane of the saw blade in its operative position, the width of this recess being such as to snugly receive the thickness of the saw blade with the minimum clearance necessary to permit of the easy engagement or disengagement of the blade.

At the lower end of the plunger, and diametrically opposite the recess 38, there is provided a blade edge receiving slot 39 inwardly offset from the inner cylindrical wall of the chuck portion. The slot 39 constitutes the vertical part of a T-slot having a horizontal part 40 in the form of a saw cut, the slot 39 being inwardly offset by pressing inwardly the pair of lug portions 41—41 formed at each side of the slot portion 39 by the cutting of the T-slot. Like the recess 38, the slot 39 is of such width as to snugly receive the thickness of the blade with a minimum clearance to allow for easy engagement and disengagement of the blade.

The saw blade 42 comprises an upper shank portion 43 and a lower toothed cutting portion 44. The shank portion 43 has parallel side edges and is of a width substantially corresponding to the internal diameter of the chuck portion 31 of the plunger, so that it may be vertically engaged and disengaged with the chuck portion in the central diametric plane thereof, and when so engaged will extend diametrically across the chuck portion with a minimum clearance at its edges. Thus, while the blade may be rotated about its vertical central axis, it will be supported by the curvature of the cylindrical wall against displacement from its diametric position.

The upper end edge 45 of the blade is pointed in shape and slightly rounded at its centrally disposed apex, so that it will engage in the pocket 34 at the lower end of the set screw with a fit that will permit the blade to be rotated with respect to the set screw, and will also permit the set screw to be rotated with respect to the blade but will, at the same time, retain the blade against relative movement about either of its edges as a fulcrum. In other words, if either of the edges of the blade is held against movement, the engagement of the set screw with the upper end 45 constitutes a fixed point of support of the blade between its edges, so that it will prevent turning movement of the blade as long as one edge of the blade is held, even though the blade clearance may be such that there is a loose fit between the blade and the wall of the plunger.

In the rearward edge of the shank portion 43 of the blade, there is provided a vertically extending notch 46 of such depth as to clear the depressed lug 35, and of such height that its upper and lower end walls will clear the upper and lower edges of the lug 35 when the blade is inserted in the chuck portion of the plunger to the point where the notch 46 is in lateral alignment with the lug 35. In the forward edge of the shank portion there is provided a notch 47 of such depth as to clear the depressed lugs 41, and of such height that its upper and lower end walls clear the upper and lower edges of the lugs 41 when the blade is inserted in the plunger to the position just described where the notch 46 is in lateral alignment with the lug 35.

The rearward edge of the lower portion of the blade is in vertical line with the rearward edge of the shank portion so that such rearward edge will be in parallel relation to the vertical movement of the plunger when the shank portion is secured therein. The saw teeth 48 upon the forward edge are in a line slightly off parallel, allowing the widest portion of the cutting teeth to be at the lower end of the saw blade. This off parallel relation is very slight, of the order of about one to one and one half degrees, and is designed to give the blade a slight rake on the cutting stroke, and to give the tendency of release on the down stroke or non-cutting back stroke, but not enough angle to interfere with a perpendicular cut on small curves or radii cuts.

Secured to the lower forward portion of the housing 10, by means of countersunk screws 49, is a saw table 50 which rests against the material being sawed and moves over the surface thereof when the saw is in operation. This saw table is of convenient size and preferably has its forward edge curved upwardly as shown, so as to slide easily over the surface of the material being sawed, and it is also forked or slotted at its forward end, as at 51, to make it easier to observe the cutting operation and to provide an opening through which the saw blade moves. In operation, the saw teeth cut on the up stroke, thus helping to hold the table 50 of the tool in firm engagement with the material being sawed.

The vertical back edge of the rigidly supported saw blade runs upon a fixedly positioned roller track provided adjacent the upper side of the saw table. The parallel alignment of the back edge of the blade with the plunger makes this possible without the necessity for having a spring means to keep the guide roller against the blade. The roller track consists of a grooved roller 52 rotatably supported upon a pin 53 in the slot opening 54 of a bracket 55. During operation of the saw blade, the bracket 55 is in a fixed position, but for the purpose of adjustment and to move the roller clear of the blade when inserting or removing the latter, the bracket is mounted for longitudinal adjustment. For this purpose, a bolt 56 having its head engaged in a countersunk hole 57 in the saw table is engaged upwardly through the slot 54 and has a nut 58 upon its upper end which may be tightened against the upper side of the bracket to fix its position.

A vertical pin 59 is secured in a hole 60 in the rearward end of the bracket and projects downwardly into sliding engagement with a slot 61 provided in the saw table in longitudinal line with the bolt 56 and the slot opening 54 of the bracket. As shown in Fig. 10, the roller may be backed away from the edge of the saw blade upon loosening the bolt 56, so that the blade may be readily removed from the chuck or engaged therewith, it being pointed out that the slot 51 in the saw table provides sufficient clearance to enable the saw blade to be rotated about its central axis.

Referring to Fig. 10, the saw blade is adapted to be secured to the plunger by first removing the knob 20 and inserting a screw driver 62 through the opening 18 and into the upper bore 30 of the plunger to engage the set screw 33, the set screw being turned to bring it to a relatively raised position in the upper end of the blade receiving chuck portion 31. This operation is best carried out with the plunger at the limit of its down stroke, as shown in Fig. 10, so that the lower end of the plunger is exposed below the lower end of the sleeve 16. Also, during this operation, the guide roller is backed off from its engaging position with the blade. The shank end of the blade is thereupon inserted in the chuck portion 31 of the plunger in a position, as shown in full lines, turned 90° from its normal operating position.

In the raised position of the set screw, the respective notches 46 and 47 are in lateral alignment with the depressed lug 35 and the lugs 41, so that the blade may be rotated about its vertical axis to bring it from the full line position shown in Fig. 10 to the position shown in dot-and-dash lines, where its rearward and forward edges are respectively in vertical line with the recess 38 and the slot 39. In this position the blade will drop downwardly to engage the upper end wall of the notch 46 within the recess 38 and the upper end wall of the notch 47 in the slot 39, as shown in Fig. 8. Thereupon the set screw 33 is screwed downwardly against the upper end of the blade to press the upper end wall of the notch 46 against the base of the recess 38 and to lock the blade against upward movement so that it is thus rigidly connected to the plunger.

In order to release the blade, it is only necessary to screw the set screw upwardly to the point where the blade may be raised sufficiently to disengage the respective upper end wall of the notches 46 and 47 from the recess 38 and slot 39, whereupon the blade may be turned 90° to clear the lugs 35 and 41 to allow it to be withdrawn from the plunger.

It will be observed that the blade, in its locked position, is actually held at three points, namely, the point of engagement of its rear edge with the lug 35; the point of engagement of its upper pointed end 45 with the recessed center of the set screw; and the point of engagement of its forward edge in the slot 39 between the lugs 41. While any two of these points of support will prevent twisting of the blade within the plunger, as long as there is a substantially snug fit of the parallel side edges of the blade in the plunger, the three points of support insure against any possibility of twisting movement, even though there may be a slight clearance between the blade and the plunger, such as may commonly result from usual manufacturing tolerances.

What is claimed is:

1. A tool holding chuck to receive and retain a flat sided tool shank having parallel edges and having a notch in at least one edge having longitudinally spaced end walls, comprising a tubular body having a cylindrical bore open at its outer end and having an axially extending shank receiving free space of a diameter to receive said tool shank through said open end with a sliding fit of its edges with the cylindrical wall of said bore for turning movement of said tool shank therein about the axis of said bore, shank retaining means within said bore comprising an inset portion of said tubular body extending across the circumference of said cylindrical bore in offset relation to said free space and adapted to be received within said notch of said tool shank upon said turning movement thereof, the inner end of said inset portion having an upwardly facing recess having its axial center in diametric line with the axis of said bore and having a base wall and side walls spaced to receive with a sliding fit the marginal edge portion of said tool shank in longitudinal line with said notch, and a set screw axially movable in the inner end of said bore engageable with the end of said tool shank to restrain its inward movement, and adapted upon outward movement to axially move said shank outwardly and to press the inner end wall of said notch against the opposed base wall of said recess, inward movement of said set screw permitting inward movement of said tool shank to disengage said end wall of said notch from said recess.

2. The invention as defined in claim 1, wherein said tool shank is provided at its inner end with an axially centered bearing portion, and said set screw is provided in its lower end with a bearing portion engaging means adapted to engage and retain said bearing portion in axially centered relation therewith.

3. A tool holding chuck to receive and retain a flat sided tool shank having parallel edges and having notches respectively in its edges, each having longitudinally spaced end walls and the notch in one edge being in longitutdinally inwardly offset relation to the notch in the other edge, comprising a tubular walled body having a cylindrical bore open at its outer end and having an axially extending shank receiving free space of a diameter to receive said tool shank through said open end with a sliding fit of its edges with the cylindrical wall of said bore for turning movement of said tool shank therein about the axis of said bore, shank retaining means within said bore comprising an inset portion of said tubular body in offset relation to said free space and adapted to be received within said inner notch of said tool shank upon said turning movement thereof, the inner end of said inset portion having an upwardly facing recess having its axial center in diametric line with the axis of said bore and having a base wall and parallel side walls spaced to receive with a sliding fit the marginal edge portion of said tool shank in longitudinal line with the upper end wall of said notch, a second shank retaining means comprising an inset portion of said tubular body in offset relation to said free space and being longitudinally outwardly offset from and in diametrically opposite relation to said first retaining means, said second retaining means adapted to be received within said outer notch of said tool shank upon turning movement thereof and having a longitudinal slot having its axial center in diametric line with the axis of said bore and adapted to receive with a sliding fit the marginal edge portion of said tool shank in longitudinal line with the upper end wall of said outer notch, and a set screw axially movable in the inner end of said bore engageable with the upper end of said tool shank to restrain its inward movement, and upon its outward movement to press said upper ends of said inner and outer notches respectively against the base wall of said recess and into said slot, inward movement of said set screw permitting inward movement of said tool shank to disengage the upper ends of said notches from said recess and slot.

4. The invention as defined in claim 3, wherein said tool shank is provided at its inner end with an axially centered bearing portion, and said set screw is provided in its lower end with a bearing portion engaging means adapted to engage and retain said bearing portion in axially centered relation therewith.

References Cited in the file of this patent

UNITED STATES PATENTS

| | | |
|---|---|---|
| 1,005,370 | Turney | Oct. 10, 1911 |
| 1,501,222 | Lamp | July 15, 1924 |
| 2,408,567 | Mauch | Oct. 1, 1946 |
| 2,632,489 | Johnson | Mar. 24, 1953 |
| 2,639,737 | Forsberg | May 26, 1953 |